United States Patent
Bamford et al.

(10) Patent No.: US 6,681,035 B1
(45) Date of Patent: Jan. 20, 2004

(54) METHOD OF UNSUPERVISED CELL NUCLEI SEGMENTATION

(75) Inventors: Pascal Bamford, Bardon (AU); Brian Lovell, Indooroopilly (AU)

(73) Assignee: CSSIP (Cooperative Research Centre for Sensor Signal and Information Processing)

( * ) Notice: Subject to any disclaimer, the term of this patent is extended or adjusted under 35 U.S.C. 154(b) by 0 days.

(21) Appl. No.: 09/647,269
(22) PCT Filed: Mar. 30, 1999
(86) PCT No.: PCT/AU99/00231
§ 371 (c)(1), (2), (4) Date: Sep. 27, 2000
(87) PCT Pub. No.: WO99/52074
PCT Pub. Date: Oct. 14, 1999

(30) Foreign Application Priority Data

Apr. 3, 1998 (AU) .............................................. PP2786

(51) Int. Cl.[7] .................................................. G06K 9/00
(52) U.S. Cl. ..................... 382/133; 382/305; 382/173
(58) Field of Search ................................ 382/133, 173, 382/305, 288, 218, 199; 707/1; 377/10; 358/403

(56) References Cited

U.S. PATENT DOCUMENTS

| | | | | |
|---|---|---|---|---|
| 4,175,860 A | * | 11/1979 | Bacus ......................... | 356/39 |
| 4,523,278 A | | 6/1985 | Reinhardt et al. .......... | 364/413 |
| 5,745,601 A | * | 4/1998 | Lee et al. .................... | 382/225 |
| 5,986,771 A | * | 11/1999 | Henderson et al. ......... | 358/448 |
| 5,987,158 A | * | 11/1999 | Meyer et al. ................ | 382/133 |
| 6,581,011 B1 | * | 6/2003 | Johnson et al. ............. | 702/19 |

FOREIGN PATENT DOCUMENTS

WO  WO93/18483  9/1993

OTHER PUBLICATIONS

Bamford et al., "Improving the Robustness Cell Nucleus Segmentation," Sep. 14–17, 1998, Proc. 9th British Machine Vision Conf. pp. 518–524.*

Bamford et al., "A Two-Stage Scene Segmentation Scheme for the Automatic Collection of Cervical Cell Images," 1997, IEEE TENCON, pp. 683–686.*

Bamford et al., "Bayesian Analysis of Cell Nucleus Segmentation by a Viterbi Search Based Active Contour," Aug. 16–20, 1998, IEEE, vol. 1, pp. 133–135.*

Lee et al., "A Fast and Robust Approach for Automated Segmentation of Breast Cancel Nuclei," Oct. 25–27, 1999, International Conference on Computer Graphics and Imaging, pp. 1–9.*

(List continued on next page.)

*Primary Examiner*—Daniel G. Mariam
*Assistant Examiner*—Shefali Patel
(74) *Attorney, Agent, or Firm*—Oppenheimer Wolff & Donnelly LLP

(57) ABSTRACT

A method of segmentation of cell nuclei is described that uses an active contours approach based on a Viterbi search algorithm. Also disclosed is an initialisation technique that maximises the probability of a correct segmentation. The invention also includes a method to classify cell nuclei according to the difficulty of correct segmentation. Nuclei that are difficult to segment can be rejected to minimise the probability of false positives. The probability of false positives can be driven close to 0%.

15 Claims, 4 Drawing Sheets

OTHER PUBLICATIONS

Bamford et al., "A Methodology for Quality Control in Cell Nucleus Segmentation," Dec. 7–8, 1999, Digital Image Computing: Technique Application, pp. 1–5.*

Schupp et al., "Mathematical Morphology and Active Contours for Object Extraction and Localization in Medical Images," pp. 317–321.*

Nasrabadi et al., "A Stereo Vision Technique Using Curve–Segments and Relaxation Matching," 1988, IEEE, pp. 149–151.*

Krivanek et al., "Ovarian Ultrasound Image Analysis: Follicle Segementation," 1998, IEEE, pp. 935–944.*

"The Measuring of Cell Features" by Ewert Bengtsson, Ph.D. Published in Analytical and Quantitative Cytology and Histology, vol. 9, No. 3, Jun. 1987.

"A Water Immersion Algorithm for Cytological Image Segmentation" by Pascal Bamford and Brian Lovell, Presented to the Cooperative Research Center for Sensor Signal and Information Processing, Department of Electrical and Computer Engineering, University of Queensland, Australia.

"A Robust Snake Implementation; A Dual Active Contour" by Steve R. Gunn and Mark S. Nixon Published in IEEE Transactions on Pattern Analysis and Machine Intelligence, vol. 19, No. 1, Jan. 1997.

Herrera–Espineira et al., "Automated Segmentation of Cell Nuclei in Fine needle Aspirates of the Breast", Analytical and Quantitative Cytology and Histology, vol. 20, No. 1, Feb. 1998, pp. 30–35.

Xiao et al., An Algorithm for Automatic Tracking of Nuclear Boundaries, Analytical and Quantitative cytology and Histology, vol. 16, No. 4, Aug. 1994, pp. 240–246.

MacAulay et al., "An Edge Relocation Segmentation Algorithm", Analytical and Quantitative Cytology and Histology, MacAulay and Palcic, vol. 12, No. 30, Jun. 1990, pp. 165–171.

MacAulay, et al., "A Comparison of Some Quick and Simple Threshold Selection Methods for Stained Cells", vol. 10, No. 2, Apr. 1988, vol. 10, No. 2, Apr. 1988; pp. 134–138.

* cited by examiner

METHOD OF UNSUPERVISED CELL NUCLEI SEGMENTATION

This invention relates to an improved method of segmenting objects in an image. In particular, it relates to a method of active contours using a Viterbi search algorithm for unsupervised segmentation of cell nuclei.

BACKGROUND TO THE INVENTION

Various techniques exist for identifying and segmenting objects in an image. Typically an accuracy rate of greater than 90% is considered to be good. However, in biological systems, particularly screening situations, an accuracy rate approaching 100% is required.

One application in which a high level of screening confidence is required is the screening of pap smears to identify cervical cancer. Obviously, false positive and false negative indications cannot be tolerated. However, a high degree of accuracy in very large data sets has proven to be difficult to achieve. It has been established by Bengtsson [The measuring of cell features; Anal Quant Cytol; 9 (3) June 1987, 212–217] and others, that segmentation of cell nuclei is the key step in devising a computer-implemented method of unsupervised analysis.

The most common method of slide preparation for pap smear screening is the Papanicolaou process. Unfortunately, the stain used in the Papanicolaou slide preparation process does not produce a strong nucleus-cytoplasm contrast. Weak image gradients along the nuclear border and artefacts in the cytoplasm add to the difficulty of segmentation.

A segmentation success rate of 98.3% was reported on a data set of 4700 images by MacAuley [Development, implementation and evaluation of segmentation algorithms for the automatic classification of cervical cells; Ph.D Thesis; University of British Columbia; August 1989]. However, the images were obtained using a special sample preparation technique which included the use of Feulgin-Thionin and Orange(II) stains. These stains enhance the contrast of the cytoplasm to the background and the nucleus to cytoplasm. The improved contrast compared to the most common stain greatly simplifies the segmentation process. Even so, an error rate of 1.7% will be unacceptable in many cases.

Previous studies on segmentation of cervical cell nuclei from the cell cytoplasm have used global thresholding techniques, edge detection and post-processing without achieving acceptable results. An example that is typical of the prior art can be found in U.S. Pat. No. 4523278. This patent describes a method and system for automatic detection of cells and determination of cell features from cytological smear preparations. The method only uses cell nuclei for evaluation and classifies the nuclei according to a feature set consisting of topological parameters of the boundaries of the nuclei.

Another, more recent technique is active contours, such as the approach used by Gunn and Nixon [A robust snake implementation: a dual active contour; IEEE Trans Pattern Anal Mach Intell 19(1) (1997) 63–68]. Their approach is to use inner and outer contours which are required to lie within and outside the object of interest. A driving force pushes the contours towards each other which enables each contour to overcome local minima in an image. The process is halted when both contours meet. Although the Gunn and Nixon approach simplifies the initialisation, it still requires the setting of three parameters and cannot guarantee a globally minimum energy contour within the space bounded by the initial inner and outer contours. The method is not suitable where very high confidence levels are desired.

OBJECT OF THE INVENTION

It is an object of the invention to provide an improved method of image segmentation.

It is a further object of the invention to provide an improved method of unsupervised cell nucleus segmentation so that selected cell nuclei may be chosen for subsequent determination of nuclei characteristics. Other objects will be evident from the following discussion.

SUMMARY OF THE INVENTION

In one form, although it need not be the only, or indeed the broadest, form the invention resides in an improved method of cell nuclei segmentation including the steps of:
 (i) locating cell nuclei in a sample;
 (ii) initialising the segmentation method by determining a contour for a selected cell nucleus;
 (iii) conducting a first segmentation step employing a Viterbi algorithm with a first predetermined value of $\lambda$ to obtain a first nucleus boundary;
 (iv) conducting a second segmentation step employing a Viterbi algorithm with a second predetermined value of $\lambda$ to obtain a second nucleus boundary;
 (v) comparing the first and second nucleus boundary; and
 (vi) storing an image of the cell nucleus if the first boundary and the second boundary are substantially the same within a predetermined limit.

Whilst any suitable value of $\lambda$ may be used in the Viterbi algorithm for conducting the first and second segmentation steps, it is preferred that one value be low and the other value be high. Preferably the low value is about 0.1 and the high value is about 0.7.

The cell nucleus locating step preferably includes taking a low resolution image of a sample, for example cells on a pap smear slide. The scene in the low resolution image may be segmented to identify cells. This may be done with any suitable algorithm, such as a water immersion algorithm. A high resolution image may then be taken of each cell for further processing.

The initialisation step may include locating an approximate centre of a nucleus for each high resolution cell image, for example by using a converging squares algorithm, then setting up a search space as an initial step towards an approximate determination of the contour of a nucleus in each high resolution image.

In a further form the invention resides in an improved method of cell nucleus segmentation from an image containing a cell nucleus including the steps of:
 (i) constructing a search space in the image;
 (ii) searching the search space with a Viterbi algorithm using a first predetermined value of $\lambda$ to find a boundary of the nucleus;
 (iii) determining a centroid within the boundary;
 (iv) constructing an updated search space in the image centred on the centroid;
 (v) searching the updated search space with the Viterbi algorithm using the first predetermined value of $\lambda$ to find an updated boundary of the nucleus;
 (vi) comparing the update boundary with the boundary;
 (viii) repeating steps (iii) to (vi) until the boundary and the update boundary are substantially the same; and
 (ix) storing an image of the cell nucleus and the found boundary when the update boundary is substantially the same as the boundary.

Preferably a high value of λ is used for step (ii) and (v). A suitable value of λ is in the range 0.7 to 0.8.

To a first approximation, the step of comparing the update boundary to the boundary can be replaced by comparing the centroid with an updated centroid.

BRIEF DESCRIPTION OF THE DRAWINGS

Preferred embodiments of the invention are described with reference to the following figures in which.

DETAILED DESCRIPTION OF THE PREFFERED EMBODIMENT

Figure 1:
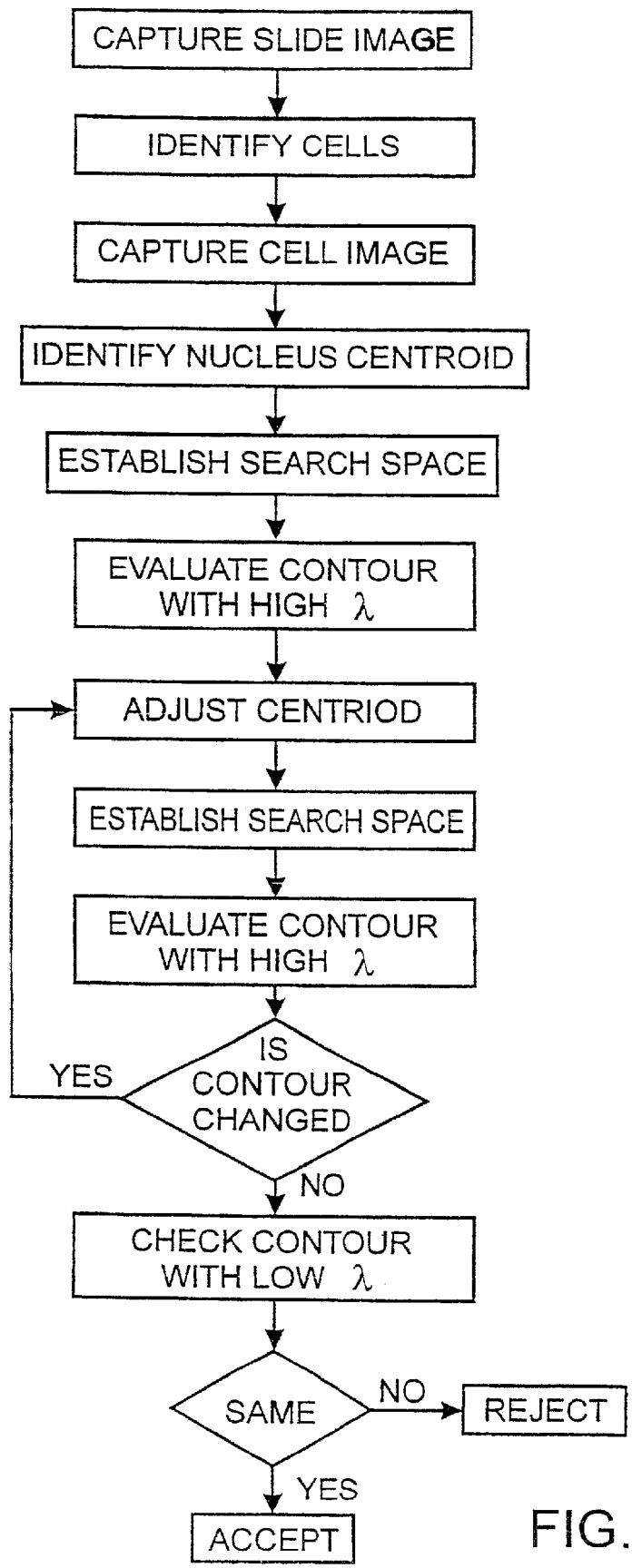
FIG. 1 is a flow chart showing the steps in cell nuclei segmentation.

Referring to FIG. 1 there is shown a flow chart of the process for cell nuclei segmentation. The method is described with reference to the preferred embodiment of identifying and segmenting cell nuclei in a pap smear slide. It will be appreciated that the steps may be generalised to apply to any segmentation task where very high confidence levels are required.

Figure 2:
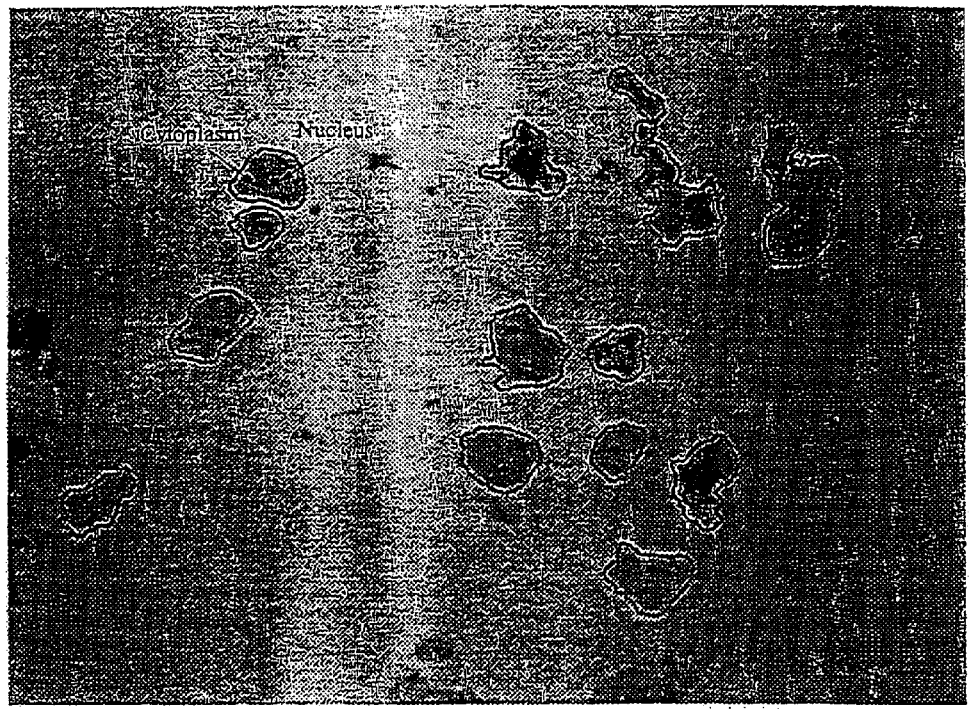
FIG. 2 is a low resolution scene of a cervical smear slide.

Scenes from a cervical smear slide are captured at low resolution using a CCD camera mounted upon a microscope. Locations of the cells within the image are identified using any suitable technique. One technique is to use the 'water immersion algorithm' described by Bamford and Lovell [A water immersion algoritm for cytological image segmentation; APRS Image Segmentation Workshop, University of Technology Sydney, Sydney, December 1996, 75–79]. An example of a scene segmented using the water algorithm is shown in FIG. 2.

Once the cells have been identified a high resolution image is taken of each cell for further processing. The image is suitably a gray scale image having 256 gray levels with black being level 0 and white being level 255.

In general terms, the invention requires the identification of a region of interest within the image. The shape, size and location of this region is influenced by the high-level knowledge of the required image object and sets up the image search space of the active contour. The task then is to consider every possible closed contour within the search space to identify the object boundary. In order to give an upper limit to the number of possible contour configurations, the search space is discretised into an array of points. Each contour that lies upon the points of the search space is then considered and an associated cost is calculated which represents a balance of its smoothness, how much it lies upon pixels with high image gradient or some other function depending upon application. The single contour of least cost at the completion of the algorithm becomes the chosen solution.

Now looking at the invention in detail, the first step is to identify a small region that can be confidently considered to be within a cell nucleus and preferably the centroid of the nucleus. One algorithm suitable for this step is the converging squares algorithm. The technique commences with a square image that is known to contain a cell nucleus. Four squares are set up inside the image with each square being one row and column narrower than the original image. If the original image was 256×256 pixels, each square will be 255×255 pixels. This step is depicted in FIG. 3a.

All of the pixels that lie within each square are summed to produce four numbers. The square with the lowest number contains the darkest area of the image. Further processing continues on the darkest square in similar fashion, so the next four squares will be 254×254 pixels, and so on. The process is continued until the squares reach the smallest possible size of a nucleus or until the squares reduce to a single pixel. The final square will be the darkest area in the original image and can be confidently considered to be within a cell nucleus.

Figure 3:
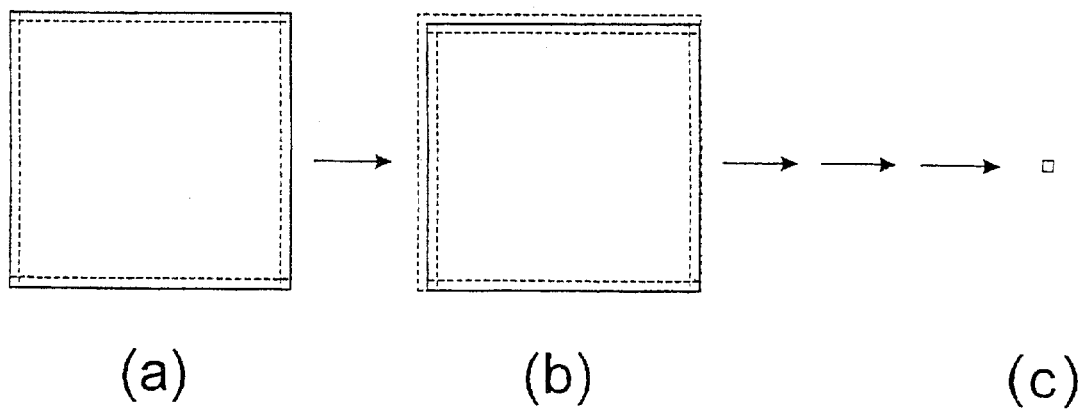
FIG. 3 depicts the method of converging squares for nucleus identification.

In the preferred method, the process is terminated when the squares reach the approximate size of a cell nucleus. The centroid of the square is a good approximation of the centroid of the nucleus. The complete process is depicted in FIG. 3. Other processes for locating a centroid of a nucleus could be used, for example simple gray scale thresholding.

Figure 4:
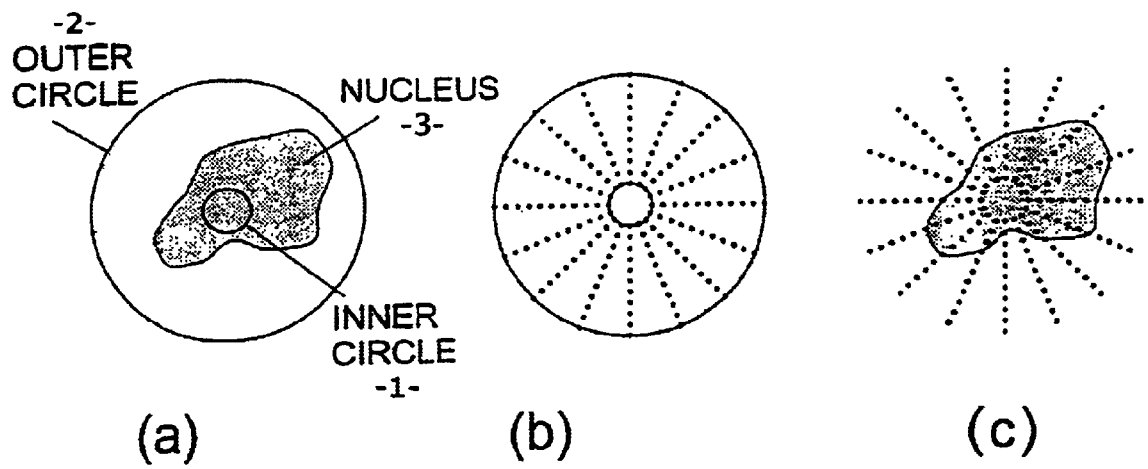
FIG. 4 shows the process of discretising the search space.

Cell nuclei are generally elliptical and of random orientation. It is therefore appropriate to select two circles as the inner and outer contours to establish a search space to locate the nucleus boundary. The establishment of the search space is shown in FIG. 4. The inner circle 1 is centred on the selected centroid from the previous step. An outer circle 2 is established concentric with the inner circle 1 and at a sufficient distance to surround the nucleus 3. An appropriate separation between the inner and outer circle will be evident from a knowledge of the problem.

The space between the circles is discretised into N radii joining the inner and outer circles. Each radii is then divided into M points. The space is therefore discretised into N×M points, as shown in FIG. 4.

The establishment of the search space is an entirely arbitrary process. The inner and outer boundaries to the search space need not be ellipses, nor need they be concentric. However, it is convenient to follow this standard for further explanation.

Figure 5:
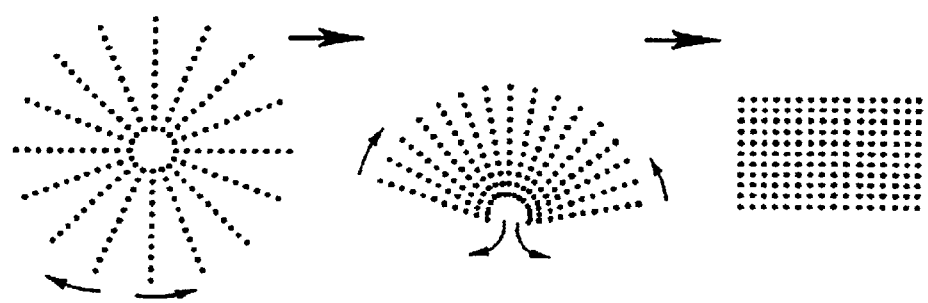
FIG. 5 shows unwrapping of the search space to form a trellis.
Figure 6:
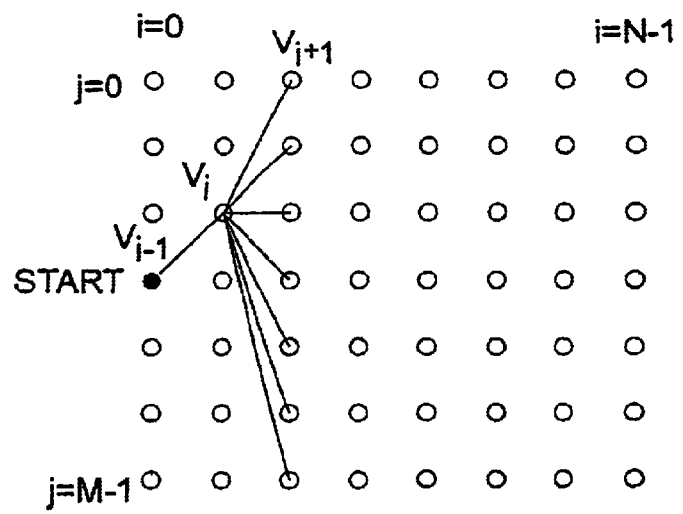
FIG. 6 shows the operation of the search algorithm.

The search space can be conceptually unwrapped at some point to form a trellis, as shown in FIG. 5. Once the trellis is formed, a search algorithm, such as a Viterbi algorithm, can be used to find the path through the trellis that has the least cost. The path through the trellis is evaluated column by column, as shown in FIG. 6. The cost is calculated for each path to the following stage by $$S_i(v_{i+1}, v_i) = \min[S_{i-1}(v_i, v_{i-1}) + \lambda E_{int}(v_{i-1}, v_i, v_{i+1}) + (1-\lambda)E_{ext}(v_i)]$$

where $$E_{int} = \left(\frac{v_{i+1} - 2v_i + v_{i-1}}{v_{i+1} - v_{i-1}}\right)^2$$

is a measure of smoothness $E_{ext}(v_i)$ is the gray scale gradient at $v_i$.

The regularisation parameter, λ can take any value between 0 and 1. The parameter balances the smoothing effect of the internal energy, $E_{int}$, with the effect of the image energy, $E_{ext}$. A low value of λ will cause the points of greatest gradient to be chosen along each radius. This can cause a very irregular path to be selected. A high value of λ will cause the algorithm to ignore the gradient information and the resulting contour will form the smoothest shape allowable by the search space (a circle). The value of λ is chosen to lie between the two extremes, the exact value depends upon the nature of the feature being segmented.

For the reasons explained below, λ is chosen as 0.7 or 0.8. As the curvature term requires three points for calculation, the cost equation becomes a function of $v_i$ and $v_{i+1}$, with $v_{i-1}$ fixed as a node producing the path of least cost from the previous stage. When the final stage is reached, the node which has the minimum cost is retained and the path travelled from this node to the starting node is retraced, producing the minimum cost contour.

At each stage only the lowest cost node is kept. Thus only N, rather than $M^N$, nodes need be retained. It will be appreciated that this process finds the minimal open contour through the search space because there are no constraints on the start or end points. It is possible to evaluate the $M^2$ combinations of end points to find the minimum energy nodes to close the path. Alternatively, two adjacent nodes in the middle of the open contour can be selected as the start and end points for a second search.

Once the closed minimum energy contour has been established the trellis is conceptually re-wrapped and the contour becomes the nucleus boundary. In many applications the above method will result in segmentation of nuclei with a high degree of confidence.

Figure 7:
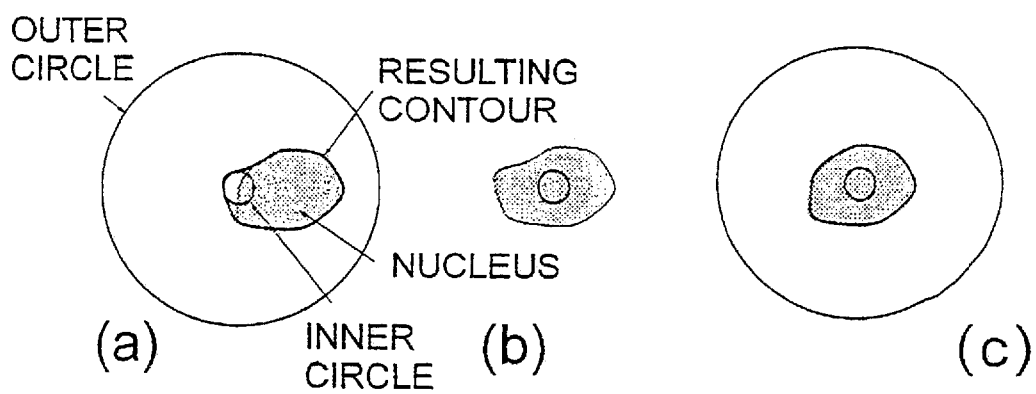
FIG. 7 shows the process of initialisation correction.

In some cases, the initial point selected by the contracting squares technique will lie close to the boundary of the nucleus. This can result in the calculated boundary being inaccurate in the locality of the starting point. This problem is depicted in FIG. 7a. An initialisation correction method can ameliorate the problem. The method is included as a step in the flow chart of FIG. 1. After the nucleus boundary has been evaluated the centroid of the evaluated contour is determined. This can be done from the open contour thereby avoiding the extra step of closing the contour.

The inner and outer circles are repositioned to the centroid and the contour is re-evaluated using the same value for λ. The centroid of the re-evaluated contour is determined. If the contour is the same within a given limit it indicates that the correct nucleus boundary has been found. To a first approximation, the boundary can be assumed to be correct if the centroid has not moved. If the boundary (or the centroid does move), the process is repeated until a contour is found in which the centroid does not move.

The above process is based upon a determination of the gray scale gradient at each pixel. Improved results can be achieved in some situations if a directional gradient is used. The gradient is evaluated along each radius in the direction towards the centre of the nucleus. This results in only the light to dark transitions attracting the contour and avoids the contour being attracted by nearby dark objects.

Figure 8:
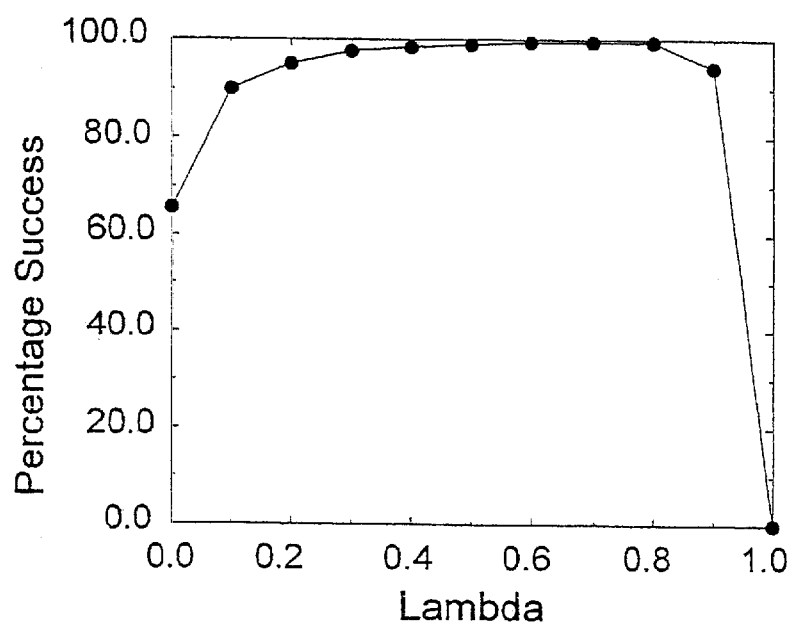
FIG. 8 shows a plot of segmentation accuracy versus regularisation parameter.
Figure 9:
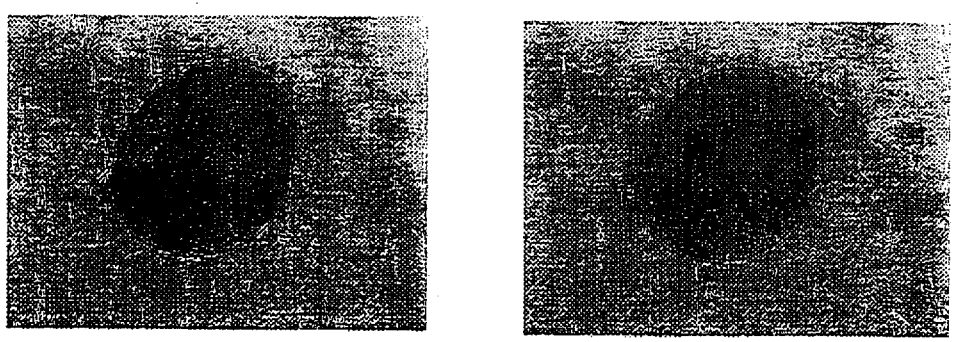
FIG. 9 shows a difficult segmentation.

As mentioned above, a suitable selection of λ is necessary for high confidence nuclei boundaries to be determined. FIG. 8 shows the percentage of successful segmentations as a function of λ in the Viterbi algorithm. The sensitivity of the algorithm to the value of λ is shown in FIG. 9 for a difficult nucleus image having a dark patch of cytoplasm adjacent the nucleus.

The chart in FIG. 8 shows that the performance of the Viterbi algorithm varies monotonically for 0<λ<0.8 and the solutions for $λ_1$ are a strict subset of the solutions for $λ_2$, where $λ_1<λ_2$.

It is therefore evident that similarity between contours segmented with a high value of λ, say 0.7, and a low value of λ, say 0.1, indicates a high level of confidence in the segmentation. The definition of similarity may be somewhat arbitrary, but for the purposes of the example an average deviation of 2.3 pixels or less is considered to be similar. Comparison of the segmentation at high λ and a series of low λ provides a system for grading nuclei images according to the difficulty of segmentation.

The following table shows one example of a classification system using the above criteria. The table shows the percentage of the total number of images that are accepted using a low λ value of 0.0 for level 0, 0.1 for level 1, and so on. Also shown in the table is the number of known failures (visual inspection) that occur at each level.

| Level | 0 | 1 | 2 | 3 | 4 | 5 | 6 |
|---|---|---|---|---|---|---|---|
| % images | 54.65 | 73.12 | 80.53 | 85.93 | 90.07 | 92.98 | 95.83 |
| Failures | 0 | 0 | 1 | 3 | 9 | 14 | 19 |

It can be seen from the table that at an acceptance level of 1, 73.12% of the images would be accepted with a 100% confidence of no failures. The confidence level can be chosen to suit the application. In the primary example of pap smear analysis, a confidence level of 1 will be chosen as false positives cannot be tolerated.

The above method has been tested for automatic segmentation of Papanicolau stained cervical cell nuclei. Using the active contour method with the Viterbi search algorithm a success rate of 99.64% correct segmentations on a data set of 20,130 images. The success rate was increased to 100% by rejecting 26.88% of the images. The images could then be confidently used for further analysis, such as detection of cervical cancer.

What is claimed is:

1. An improved method of cell nucleus segmentation from an image containing a cell nucleus including the steps of:
   (i) constructing a search space in the image;
   (ii) searching the search space with a Viterbi algorithm using a first predetermined value of λ to find a boundary of the nucleus;
   (iii) determining a centroid within the boundary;
   (iv) constructing an updated search space in the image centred on the centroid;
   (v) searching the updated search space with the Viterbi algorithm using the first predetermined value of λ to find an updated boundary of the nucleus;
   (vi) comparing the update boundary with the boundary;
   (vii) repeating steps (iii) to (vi) until the boundary and the update boundary are substantially the same;
   (viii) storing an image of the cell nucleus and the found boundary when the update boundary is the same as the boundary;
   (ix) searching the search space with a Viterbi algorithm using a second predetermined value of λ to find an update boundary of the nucleus; and
   (x) rejecting the nucleus if the update boundary differs from the boundary by greater than a predetermined amount.

2. The method of claim 1 wherein the search space is constructed from an inner and outer curve, said inner curve being substantially within the nucleus and said outer curve being substantially outside the nucleus.

3. The method of claim 1 wherein the first λ value is greater than 0.5 but less than 0.9.

4. The method of claim 1 wherein the first λ value is in the range 0.7 to 0.8.

5. The method of claim 1 wherein the second λ value is greater than 0.0 but less than 0.5.

6. The method of claim 1 wherein second first λ value is in the range 0.0 to 0.1.

7. A method of cell nuclei segmentation including the steps of:
  (i) locating cell nuclei in a sample;
  (ii) initialising the segmentation method by determining a contour for a selected cell nucleus;
  (iii) conducting a first segmentation step employing a Viterbi algorithm with a first predetermined value of λ to obtain a first nucleus boundary;
  (iv) conducting a second segmentation step employing a Viterbi algorithm with a second predetermined value of λ to obtain a second nucleus boundary;
  (v) comparing the first and second nucleus boundary; and
  (vi) storing an image of the cell nucleus if the first boundary and the second boundary are substantially the same within a predetermined limit.

8. The method of claim 7 wherein the initialisation step further includes the steps of:
  utilising the Viterbi algorithm at a predetermined value of λ to obtain a first result for the nucleus contour and reevaluating the centroid of the nucleus;
  recalculating the Viterbi algorithm with the same value of λ to obtain a further centroid of the nucleus;
  comparing the first and further centroids; and
  storing a high resolution image of the nucleus if the centroids are substantially the same within predetermined limits.

9. An improved method of cell nucleus segmentation from an image containing a cell nucleus including the steps of:
  (i) constructing a search space in the image;
  (ii) searching the search space with a Viterbi algorithm using a first predetermined value of λ to find a boundary of the nucleus;
  (iii) determining a centroid within the boundary;
  (iv) constructing an updated search space in the image centred on the centroid;
  (v) searching the updated search space with the Viterbi algorithm using the first predetermined value of λ to find an updated boundary of the nucleus;
  (vi) comparing the updated boundary with the boundary;
  (vii) repeating steps (iii) to (vi) until the boundary and the update boundary are substantially the same; and
  (viii) storing an image of the cell nucleus and the found boundary when the update boundary is the same as the boundary.

10. The method of claim 9 wherein the step of constructing a search space includes the further steps of:
  locating a region of at least one pixel within the nucleus;
  constructing the search space between an inner and an outer curve centred on the region.

11. The method of claim 10 wherein the step of locating a region employs a method of converging squares.

12. The method of claim 10 wherein the region is approximately the minimum size of a nucleus in the image.

13. The method of claim 9 wherein the curves are ellipses.

14. The method of claim 9 including the further steps of:
  searching the search space with a Viterbi algorithm using a second predetermined value of λ to find an update boundary of the nucleus; and
  rejecting the nucleus if the update boundary differs from the boundary by greater than a predetermined amount.

15. The method of claim 14 wherein the second predetermined value of λ is less than the first predetermined value of λ.

* * * * *